United States Patent [19]

Nordeen

[11] 4,323,112
[45] Apr. 6, 1982

[54] NO ENERGY BAND TEMPERATURE CONTROL

[75] Inventor: Howard C. Nordeen, Glenview, Ill.

[73] Assignee: Mark Controls Corporation, Skokie, Ill.

[21] Appl. No.: 17,926

[22] Filed: Mar. 6, 1979

[51] Int. Cl.³ .................. F25B 29/00; G05D 23/12
[52] U.S. Cl. .................................. 165/27; 236/1 C; 236/80 B; 236/87
[58] Field of Search .............. 236/47, 87, 1 C, 91 D, 236/78 B, 78 D, 86, 80 B, 80 C; 165/27

[56] References Cited

U.S. PATENT DOCUMENTS

| | | | |
|---|---|---|---|
| 2,125,889 | 8/1938 | Crump | 236/1 C |
| 2,135,294 | 11/1938 | Snediker | 236/1 C |
| 2,384,373 | 9/1945 | Harris | |
| 2,403,798 | 7/1946 | Holmes | |
| 2,556,479 | 6/1951 | McGrath | |
| 2,558,610 | 6/1951 | Diekhoff | |
| 2,966,342 | 12/1960 | Newton | |
| 2,969,916 | 1/1961 | Shequen | |
| 3,140,047 | 7/1964 | Holloway | 165/27 X |
| 3,181,788 | 5/1965 | Norman | 236/1 |
| 3,182,909 | 5/1965 | Noakes et al. | 236/1 |
| 3,212,710 | 10/1965 | Nilles | 236/47 |
| 3,263,923 | 8/1966 | Gladstone | 236/1 |
| 3,273,797 | 9/1966 | Grahl | 236/1 |
| 3,284,002 | 11/1966 | Edelman et al. | 236/1 |
| 3,305,172 | 2/1967 | Duchek et al. | 236/47 X |
| 3,326,275 | 6/1967 | Ray | 165/26 |
| 3,411,711 | 11/1968 | O'Hara et al. | 236/87 |
| 3,424,377 | 1/1969 | Steghart et al. | 236/1 |
| 3,535,561 | 10/1976 | Pinckaers | 307/310 |
| 3,591,077 | 7/1971 | Alton | 236/69 |
| 3,767,936 | 10/1973 | Sweger | 236/68 B |
| 3,768,545 | 10/1973 | Wills | 165/27 |
| 3,856,044 | 12/1974 | Caldwell | 251/29 |
| 3,887,000 | 6/1975 | Pinckaers | 165/26 |
| 3,935,998 | 2/1976 | Caldwell | 236/1 C |
| 3,948,441 | 4/1976 | Perkins et al. | 236/46 R |
| 3,949,807 | 4/1976 | Tyler | 165/27 |
| 3,983,928 | 10/1976 | Barnes | 165/12 |
| 4,095,740 | 6/1978 | Wirth | 236/47 |
| 4,114,806 | 9/1978 | Graversen | 236/1 C |
| 4,252,270 | 2/1981 | Taylor et al. | 236/47 |

Primary Examiner—William E. Wayner
Attorney, Agent, or Firm—Hume, Clement, Brinks, Willian & Olds, Ltd.

[57] ABSTRACT

A system for controlling the temperature of an enclosed volume includes a pneumatic thermostat, heating means and cooling means. The thermostat has two entirely independent controls: a heating control and a cooling control. Both controls remain independently operative at all temperatures and each control has an independent set point. Whenever the temperature of the enclosed volume sensed by the thermostat raises above the cooling-control set point, the cooling control generates a first pneumatic signal which activates, adjusts and operates cooling means. Whenever the temperature of the enclosed volume sensed by the thermostat falls below the heating-control set point, the heating control generates a second pneumatic signal which activates, adjusts and operates heating means. The heating-control set point is lower than the cooling-control set point such that there is defined a range of sensed temperatures at which neither heating means nor cooling means is activated, adjusted or operated by the thermostat.

8 Claims, 6 Drawing Figures

NO ENERGY BAND TEMPERATURE CONTROL

BACKGROUND OF THE INVENTION

This invention relates to temperature control systems and in particular to pneumatic systems for controlling heating and cooling of an enclosed volume.

As fuel becomes scarce and expensive, the importance of effective utilization of energy for heating and cooling enclosed volumes, such as buildings, becomes extremely important. A number of voluntary and mandatory rules and regulations have been introduced to promote conservation of energy in cooling and heating new and existing buildings. One approach to conservation is to maintain the enclosed volume of a building at a comfortable temperature that minimizes the differential between the temperature inside the enclosed volume and the ambient temperature. For example, Section 5.3.2.2. of ASHRAE Standard 90-70, entitled "Energy Conservation in New Building Design" recommends maintaining the enclosed volume of a building at 72° F. during winter and at 78° F. during summer.

The present invention recognizes problems inherent in the prior art and provides a system, including a thermostat, which improves the utilization of energy for heating and cooling of enclosed volumes without appreciably decreasing the comfort of the persons inside the enclosure.

Thus, one object of the present invention is to provide a system, including a thermostat, for a more efficient utilization of energy in maintaining enclosed volumes at temperatures comfortable to the occupants.

Another object of the invention is to provide a system including a thermostat, which provides for an efficient utilization of energy but does not require changing or adjusting thermostats, regardless of the outside temperature and regardless of the presence of temporary heat or cold sources inside the enclosed volume.

A further object of the invention is to provide a system (including a thermostat) which prevents wasting of energy when there are fluctuations in temperatures that may call for alternative cooling and heating of the enclosed volume.

Other objects of the invention will become apparent to those skilled in the art upon studying this disclosure.

BRIEF DESCRIPTION OF THE INVENTION

In accordance with one aspect of the invention there is provided a system for controlling the temperature of an enclosed area, which includes a pneumatic thermostat having a heating control and a cooling control, a heating system and a cooling system. The heating control operates independently of the cooling control and each control has its own set point. Both controls are operable at all temperatures but the cooling control generates a first pneumatic signal activating or maintaining the operation of the cooling system only when the temperature of the enclosed volume sensed by the thermostat exceeds the cooling control set point. Similarly, the heating control generates a second pneumatic signal activating or maintaining the operation of the heating system. Thus, the set points define a no energy band, i.e. a range or a band of temperatures where neither heating nor cooling takes place; consequently, no energy is expanded for heating or cooling when the sensed temperature is within the no energy band.

In accordance with another aspect of the invention, a pneumatic thermostat includes a cooling control and a heating control. Each control comprises means for sensing temperature and for generating in response thereto and in response to an individual set point of each contact a separate control signal which controls the operation of heating means in case of the heating control or of cooling means in case of the cooling control. Both controls generate control signals at all temperatures; however, a signal from the heating control calls for heating only when the sensed temperature in the enclosed volume is below the set point temperature of the heating control. Similarly, the signal from the cooling control calls for cooling only when the sensed temperature in the enclosed volume is above the set point temperature of the cooling control. The set point for the heating control is at a lower temperature than the set point for the cooling control; accordingly, at temperatures between the two set points neither heating nor cooling is called for by the signals from the thermostat.

DETAILED DESCRIPTION OF THE INVENTION

The control system and the thermostat of the present invention improves energy utilization without requiring periodical adjustments of set point settings of the thermostat.

Figure 1:
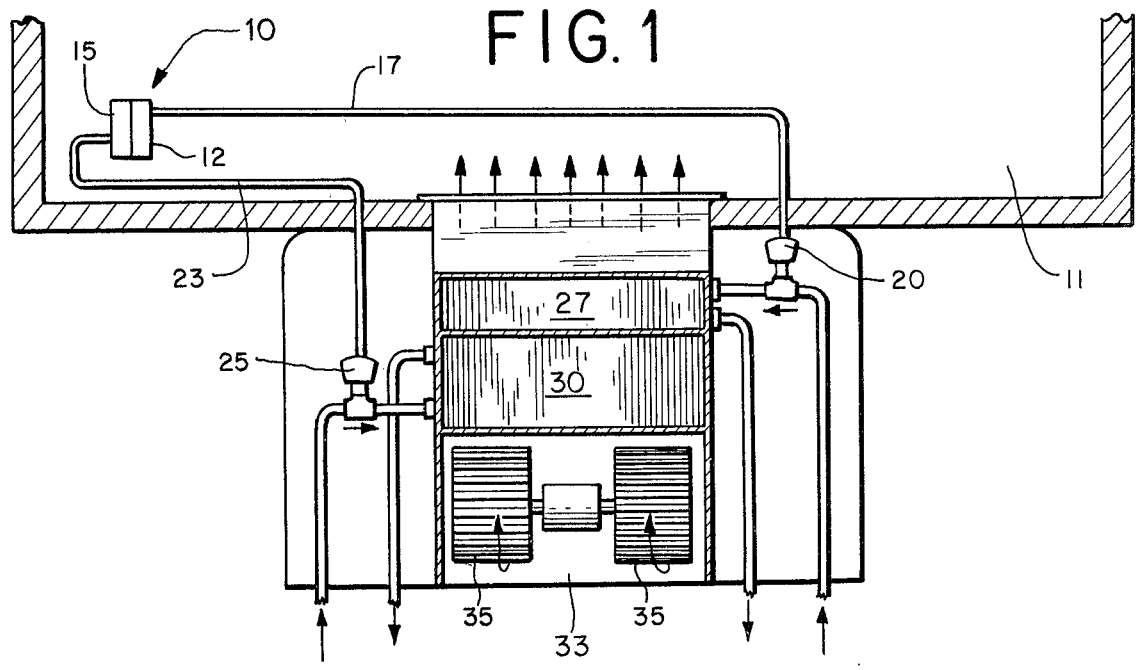
FIG. 1 is a schematic view of a control system constructed in accordance with the present invention, controlling heating coils and cooling coils.

The preferred embodiment of the present invention is depicted in the drawings. Referring now to FIG. 1, there is shown a thermostat designated generally by a numeral 10. The thermostat 10 is located inside an enclosed volume 11 and it includes a heating control 12 and a cooling control 15. The heating control 12 communicates via line 17 with a heating valve 20. Similarly, the cooling control 15 communicates via line 23 with a cooling valve 25. In response to a signal transmitted through line 17, the heating valve 20 activates, cuts off and adjusts the heat level of heating coils 27 by varying the flow rate of heating medium through said heating coils 27. The cooling valve 25 activates, cuts off and adjusts the cooling level of cooling coils 30 in response to a signal transmitted through line 23. Whenever cooling or heating is called for by the thermostat 10, the heating coils 27 or the cooling coils 30 condition the air in conduit 33 blown past them by a set of fans 35. The air from conduit 33 enters the enclosed volume 11.

Figure 2:
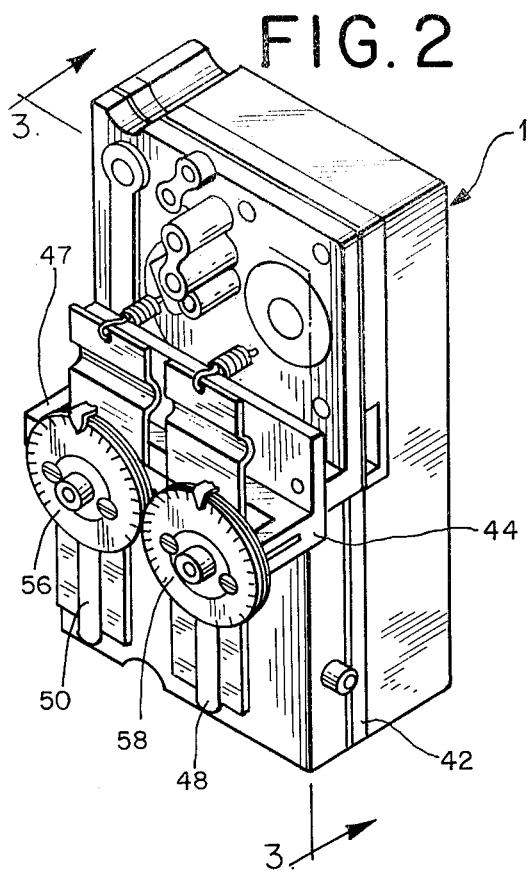
FIG. 2 is a perspective view of pneumatic thermostat for use in the system of the present invention.
Figure 3:
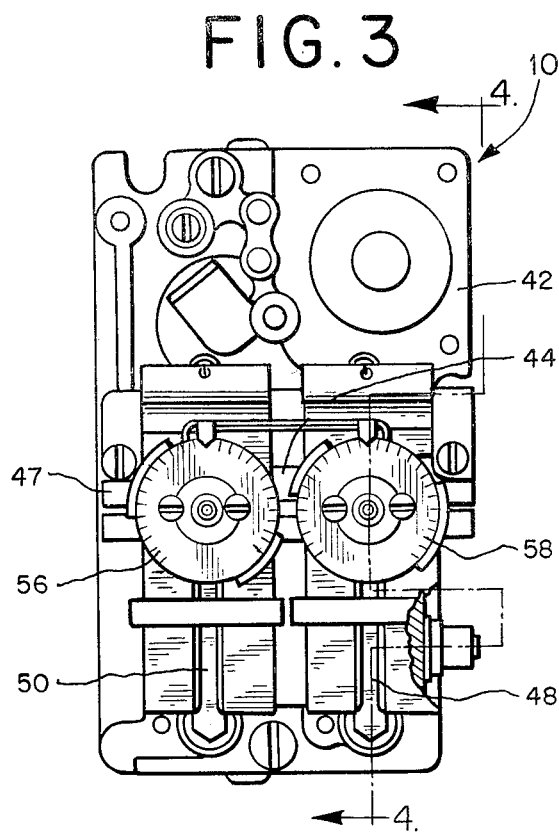
FIG. 3 is a front elevational view of the pneumatic thermostat of FIG. 2 taken along lines 3—3 thereof.

As shown in FIGS. 2 and 3, the thermostat 10 includes a conventional chassis 42 and a control assembly 44. The control assembly 44 includes a bridge 47 extending over bimetallic elements 48 and 50. Threaded openings (not shown) through the bridge 47 are provided directly above each of the bimetallic elements 48 and 50 to accommodate adjustable set points 56 and 58.

Figure 4:
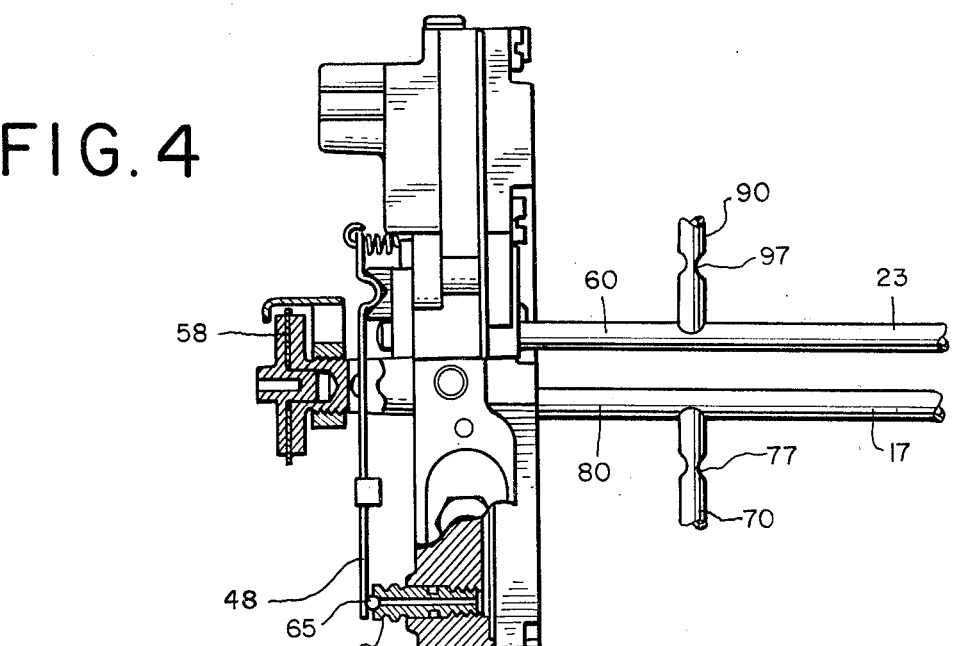
FIG. 4 is a cross-sectional view of the thermostat of FIG. 3 taken along lines 4—4 thereof.
Figure 5:
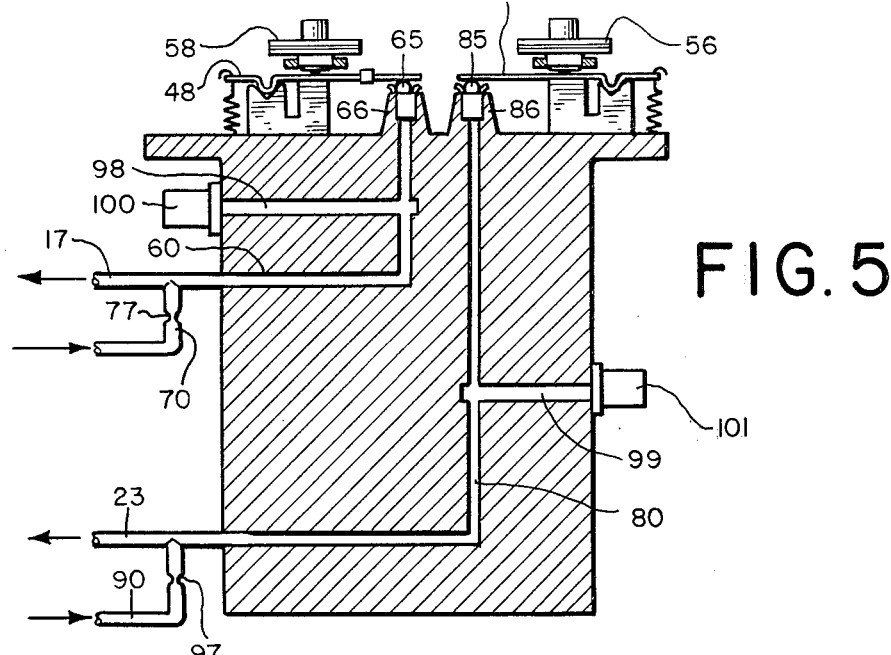
FIG. 5 is a schematic view of the internal circuits of the thermostat of FIG. 1.

FIGS. 4 and 5 show the manner in which the bimetallic element 48 adjusts the pressure in the heating control chamber 60 by acting on a throttling pin 65 in the nozzle 66. The position of the bimetallic element 48 is varied by the set point 58. The control chamber 60 communicates with the supply pressure line 70 through a restriction 77 and it also communicates with line 17. Similarly, the bimetallic element 50 adjusts pressure in the cooling control chamber 80 by acting on a throttling pin 85 in the nozzle 86. The position of the bimetallic element 50 is varied by the set point 56. The control chamber 80 communicates with the supply pressure line 90 through a restriction 97 and it also communicates with line 23.

Figure 6:
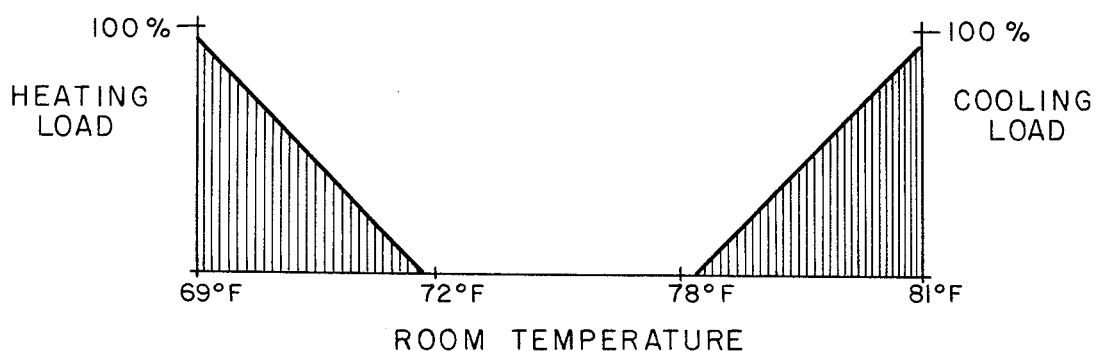
FIG. 6 is a graph of the heating and cooling load called for by the control system of this invention, as a function of temperature.

In operation, bimetallic elements 48 and 50 sense the temperature in the enclosed volume 11. The set point 58 is always set below set point 56 so that there is a range or band of temperatures between them. This range or band is preferably about 1° to about 15° F. The most preferred range of temperatures between set points 56 and 58 corresponds to the range of comfortable temperatures for occupants of the enclosed volume which is generally 72° to 78° F. See FIG. 6.

If the sensed temperature is below the temperature of the set point 58, the bimetallic element 48 causes adjustment of the pressure in chamber 60. The adjustment is made in a manner well known in the art and described, for example, in U.S. Pat. No. 3,305,172. The adjusted pressure in chamber 60 is transmitted as a signal via line 17 to valve 20 activating heating coils 27. The air entering the enclosed volume 11 is then heated at the rate proportional to the differential between the set point and the sensed temperature until the temperature sensed by the bimetallic element 48 reaches the level of set point 58. When this occurs, the pressure in chamber 60 is changed and that pressure is transmitted to the valve 20 calling for closing of the valve 20. At temperatures below the set point 56, the cooling control remains operative; however, pressure generated in control chamber 80 (in the same manner as in chamber 60) and transmitted to valve 25 via line 23 does not call for operation of cooling coils 30. The pressure in chamber 80 transmitted as a signal to valve 25 via line 23 calls for the operation of cooling coils 30 only if the sensed temperature is higher than that of the set point 56.

Thus, at temperatures of the enclosed volume below the set point 58 only the heating takes place. At temperatures above set point 58 but below set point 56 neither cooling nor heating takes place. Accordingly, temperatures between the set point 56 and the set point 58 are in a no energy band. Finally, at temperatures above the set point 56 only cooling takes place. The operation of the thermostat is graphically illustrated in FIG. 6. It should be noted that the level of heating and cooling rate is varied by the pressure generated in chamber 60 and 80 which is transmitted to vary adjustable valves 20 and 25 respectively.

Also shown in the drawings are a heating test port 100 communicating with the chamber 60 via chamber 98 and a cooling test port 101 communicating with the chamber 80 via chamber 99.

The above description of the preferred embodiment is not intended to limit the scope of the invention. All changes and modifications that fall within the spirit of this invention are intended to be included within its scope as defined by the appended claims.

I claim:

1. A system for controlling the temperature in an enclosed volume comprising:
   heating means;
   cooling means; and
   a pneumatic thermostat including: a heating-control set point, a cooling-control set point, first means for sensing the temperature of the enclosed volume and the heating control set point and for generating a first pressure signal in response to the temperature in the enclosed volume and in response to the heating control set point, said first pressure signal activating or adjusting the operation of said heating means whenever the sensed temperature is below the heating control set point, and second means for sensing the temperature of the enclosed volume and the cooling control set point and for generating a second pressure signal in response to the temperature in the enclosed volume and in response to the cooling control set point, said second pressure signal activating or adjusting the operation of said cooling means whenever the sensed temperature is higher than the temperature in the enclosed volume, said first means and said second means continuously independently and simultaneously generating said first pressure signal and said second pressure signal respectively, the heating set point being lower than the cooling set point so as to define a no energy band of sensed temperatures at which neither heating means nor cooling means is operating.

2. A system as claimed in claim 1 wherein first sensing and generating means includes a first bimetallic element and second sensing and generating means includes a second bimetallic element.

3. A system as claimed in claim 1 wherein the sensed range of temperatures are temperatures at which occupants of the enclosed volume are generally comfortable.

4. A system as claimed in claim 1 wherein the heating control set point is 72° F. and the cooling control set point is 78° F.

5. A system as claimed in claim 1 wherein the no energy band of sensed temperatures is from about 1° F. to about 15° F. wide.

6. A system as claimed in claim 2 wherein the no energy band is at temperatures at which the occupants of the enclosed volume are generally comfortable.

7. A system as claimed in claim 2 wherein the heating control set point is 72° F. and the cooling control set point is 78° F.

8. A system as claimed in claim 1 wherein the no energy band of sensed temperatures is from 1° F. to about 15° F. wide.

* * * * *

UNITED STATES PATENT AND TRADEMARK OFFICE
CERTIFICATE OF CORRECTION

PATENT NO. : 4,323,112
DATED : April 6, 1982
INVENTOR(S) : Howard C. Nordeen

It is certified that error appears in the above—identified patent and that said Letters Patent is hereby corrected as shown below:

Column 4, lines 30 and 31, delete "temperature in the enclosed volume" and insert --cooling control set point-- therefore.

Signed and Sealed this

Seventeenth Day of August 1982

[SEAL]

Attest:

GERALD J. MOSSINGHOFF

Attesting Officer     Commissioner of Patents and Trademarks